(No Model.)

W. MERL.
CASTER.

No. 581,216. Patented Apr. 20, 1897.

Witnesses:
Chas. E. Poensgen.
William Miller

Inventor:
Willibald Merl.
By Hauff & Hauff
his Attorneys.

THE NORRIS PETERS CO., PHOTO-LITHO., WASHINGTON, D. C.

UNITED STATES PATENT OFFICE.

WILLIBALD MERL, OF COLOGNE, GERMANY.

CASTER.

SPECIFICATION forming part of Letters Patent No. 581,216, dated April 20, 1897.

Application filed October 15, 1896. Serial No. 608,985. (No model.)

*To all whom it may concern:*

Be it known that I, WILLIBALD MERL, a subject of the King of Prussia, Emperor of Germany, residing at Cologne, in the Kingdom of Prussia, Province of Rhenish Prussia, Germany, have invented new and useful Improvements in Rollers for Furniture, of which the following is a specification.

This invention relates to furniture-casters, and has for its object to provide a caster wherein antifriction-balls are employed for easing the swiveling movement of the part bearing the caster-wheel, the upper and lower parts of the caster being constructed to form a race for the balls and said race and balls being so arranged that the balls operate to attach said upper and lower members together, but permit them to be separated when the balls are removed from the race, as hereinafter fully explained.

To this end my invention consists in the features and in the combination, arrangement, or construction of parts hereinafter described, and definitely set forth in the claims following the description.

In the annexed drawings the new caster is shown in various forms or modifications.

Figure 3:
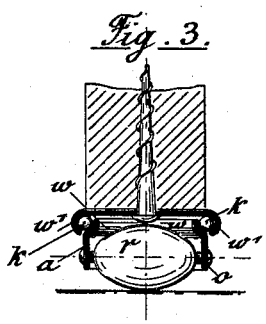
Figure 1:
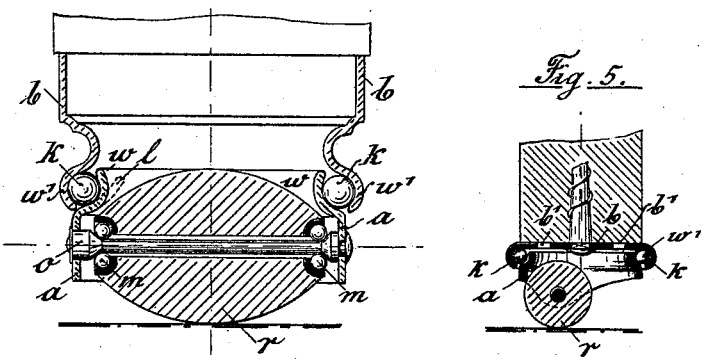
Figure 5:
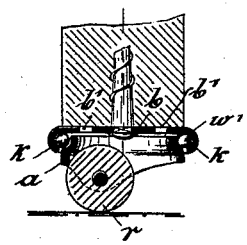
Figure 4:
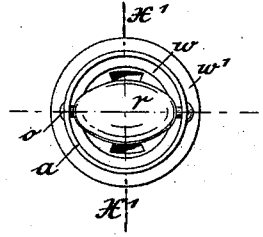
Figure 2:
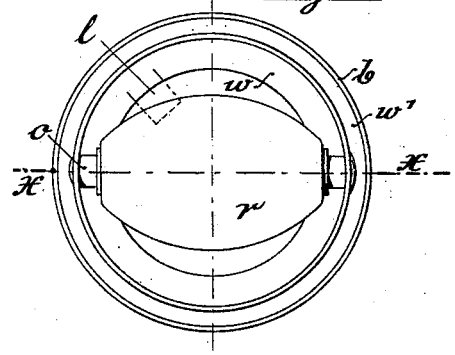
Figure 6:
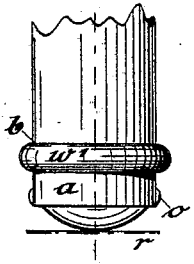
Figure 7:
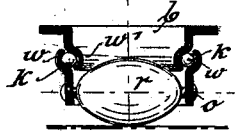
Figure 9:
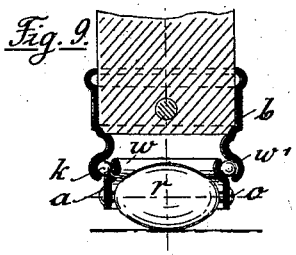
Figure 11:
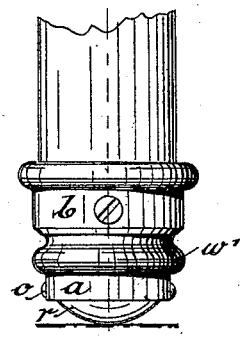
Figure 8:
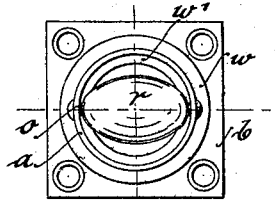
Figure 10:
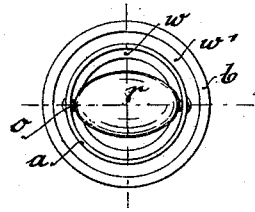

Figure 1 is a vertical section of a caster for heavy furniture. Fig. 2 is an inverted plan view of Fig. 1. Fig. 3 is a vertical section of a caster with central attaching-screw. Fig. 4 is an inverted plan view of Fig. 3. Fig. 5 is a vertical section along $x'\ x'$, Fig. 4. Fig. 6 is an elevation of Fig. 3. Fig. 7 is a vertical section showing a caster attached by a foot-plate. Fig. 8 is an inverted plan view of Fig. 7. Fig. 9 is a vertical section of a caster embodying this invention, in which the attachment is effected by a cap engaging the furniture-foot. Fig. 10 is an inverted plan view of Fig. 9. Fig. 11 is a front elevation of Fig. 9.

In all figures like parts are designated by like letters.

On the under or lower part $a$, in which on axle $o$ is journaled the roller $r$, is formed a ring-shaped bead $w$, the concavity of which can open or face outward or inward. The upper part $b$ of the caster is also formed with a like hollow or bead $w'$, the concavity of which is so set or arranged relatively to the concavity of the lower part that on inserting one part into the other the two beads form an almost closed ring-shaped tube. If now into this tube or race are placed balls $k$, which is possible since one of the beads, as seen in Figs. 1 and 2, is provided with an entrance-channel in form of a bent lip $l$, a separation of the lower and upper parts is no longer possible. When the required supply of balls has been fed in, the channel is closed by suitably bending the lip $l$. The ring or row of balls taking up the weight allows the parts united thereby easy rotation with respect to one another.

As the parts can be died or pressed from sheet metal the costs of manufacture are made very light.

The wheel or roller $r$, which is practically of oval form, can, as seen in Fig. 1, be made to run on ball-bearings $m$ on axle $o$ to diminish friction. The roller $r$ can also, as seen in Fig. 5, be journaled more or less eccentrically in the lower part, whereby, as known, an easier adjustment of the roller to the direction of motion in the shifting of the furniture is effected.

In fastening the caster by a central screw, Figs. 3 to 6, the upper part may be provided with holes $b'$ for inserting a key or screw-driver.

In each of the forms shown the upper and lower portions of the caster are held together by the balls alone, and when the balls are removed the upper and lower parts are immediately separated. The parts of the caster may thus be both assembled and separated with great ease and rapidity and without the necessity of providing attaching devices.

What I claim as new, and desire to secure by Letters Patent, is—

1. A caster comprising an upper member provided with means for attachment to furniture and a lower member carrying a caster-roller, the adjacent ends of said members being detachably inserted one within the other and provided with correspondingly-formed but oppositely-arranged beads which coöperate to form a tubular race, and a plurality of antifriction-balls disposed in said race and operating to attach said members one to the other but permitting said members to be separated when removed from the race, substantially as described.

2. A caster comprising an upper member provided with means for attachment to furniture and a lower member carrying a caster-roller, the adjacent ends of said members being detachably inserted one within the other and provided with correspondingly-formed but oppositely-arranged beads which coöperate to form a tubular race, and a plurality of antifriction-balls disposed in said race and operating to attach said members one to the other but permitting said members to be separated when removed from the race, one of said members being provided with an orifice for the introduction of the balls and a lip adapted to be bent down over the orifice to retain the balls in the race, substantially as described.

In testimony whereof I have hereunto set my hand in the presence of two subscribing witnesses.

WILLIBALD MERL

Witnesses:
W. HAUPT,
HENRY HASPER.